Feb. 16, 1926. 1,573,178
W. C. McCULLOUGH
THRASHING MACHINE
Filed Jan. 21, 1924
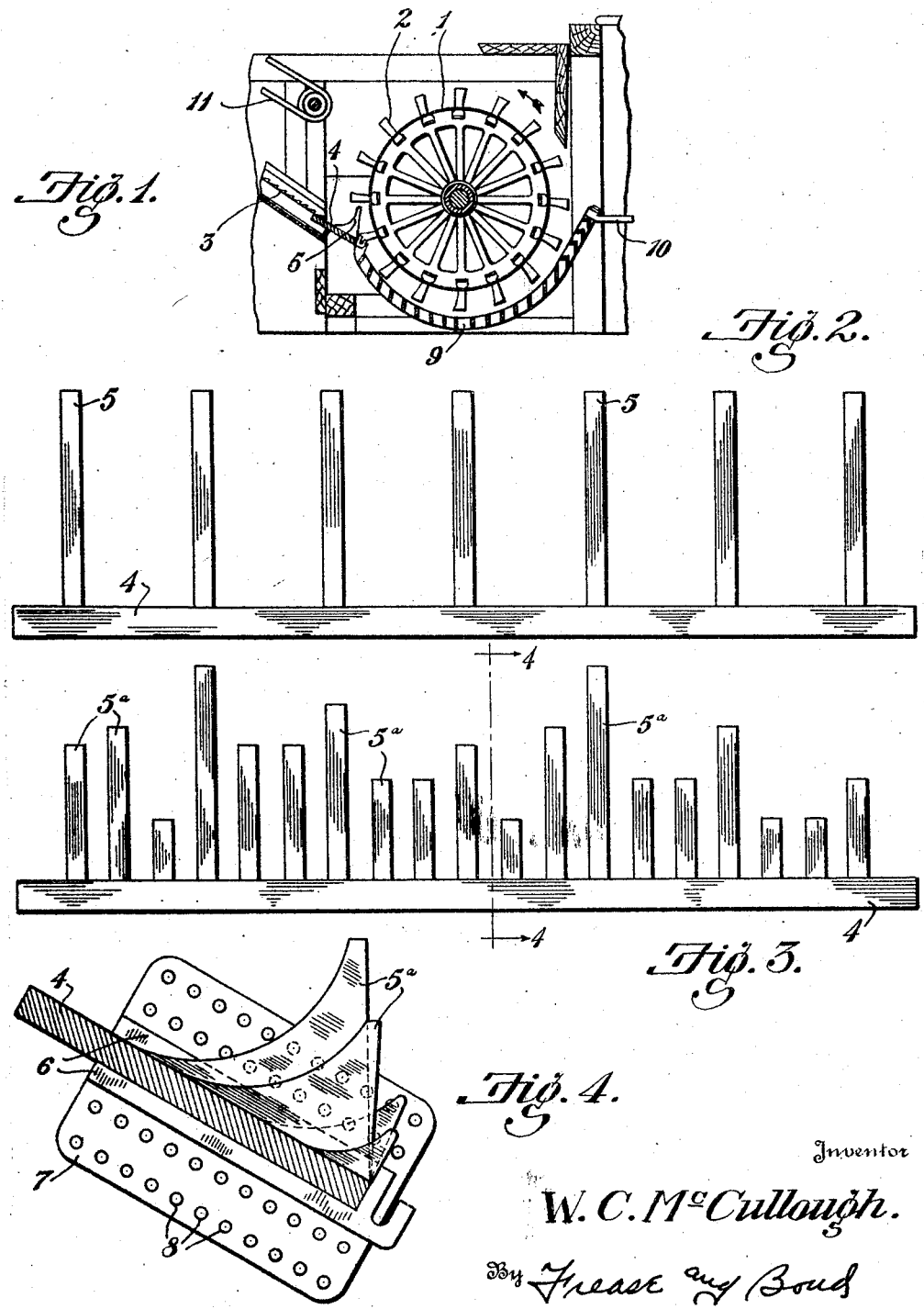
Inventor
W. C. McCullough.
By Frease and Bond
Attorneys Patented Feb. 16, 1926.

1,573,178

UNITED STATES PATENT OFFICE.

WILLIAM C. McCULLOUGH, OF FERNWOOD, OHIO.

THRASHING MACHINE.

Application filed January 21, 1924. Serial No. 687,492.

*To all whom it may concern:*

Be it known that I, WILLIAM C. McCULLOUGH, a citizen of the United States, residing at Fernwood, in the county of Jefferson and State of Ohio, have invented certain new and useful Improvements in Thrashing Machines, of which the following is a specification.

This invention relates to thrashing machines and the objects of the improvements are to provide a thrashing machine in which the usual toothed or spiked concave, which surrounds the lower portion of the cylinder, is eliminated, a grate being substituted for the same and a toothed or spiked plate being substituted for the usual feed plate and adjustably mounted to permit the teeth or spikes of the cylinder to cooperate therewith at any desired angle.

The above and other objects may be attained by constructing the device in the manner illustrated in the accompanying drawing, in which—

Figure 1 is a sectional view through a portion of a thrashing machine, showing the improved construction;

Fig. 2, a front elevation of the toothed plate forming a part of the invention;

Fig. 3, a similar view of a modified form of plate; and

Fig. 4, a section on the line 4—4, Fig. 3, showing also the means for adjustably mounting the toothed plate.

Similar numerals refer to similar parts throughout the drawing.

The usual cylinder is shown at 1 provided around its periphery with the spikes or teeth 2. The grain pan or shaking bottom 3 may be of usual construction and the lower end thereof instead of resting upon the usual feed plate, is supported upon a toothed plate 4, having the teeth 5 arranged to mesh with the spikes 2 upon the cylinder.

These teeth may all be of the same length as shown at 5 in Figs. 1 and 2 or may be of various lengths as shown at $5^a$ in Figs. 3 and 4, this latter construction being especially adapted for thrashing headed grain.

The plate 4 is preferably adjustably mounted in order that it may be tilted to locate the teeth 5 or $5^a$ at various angles with respect to the teeth or spikes upon the cylinder, to accommodate grain of different kinds, or in different conditions.

For this purpose, the plate 4 may be adjustably mounted in guideways 6 provided in the adjusting plates 7, each of which is provided with a plurality of bolt holes 8 arranged to register with four or more bolt holes in the adjacent side wall of the thrashing machine, whereby the adjusting plates may be secured to the side walls of the thrashing machine in various adjusted positions.

By providing the toothed plate 4 at the lower extremity of the grain pan or shaking bottom, the thrashing is accomplished at this point, between the spikes upon the cylinder and the teeth 5 or $5^a$ of the toothed plate.

This construction obviates the necessity of providing the usual toothed or spiked concave around the under side of the cylinder. An arcuate grate 9 extends around the under side of the cylinder, one end terminating adjacent to the toothed plate 4 and the other end may be connected to the usual fingers 10.

In the operation of the device, the grain is carried down the carrier belt 11 or other well known feeding means in the usual manner, impinging upon the teeth 5 or $5^a$ of the plate 4, at which point the thrashing takes place, the spikes 2 upon the cylinder cooperating with the teeth upon the plate to complete the thrashing operation. The straw is carried around beneath the cylinder and over the grate, the grain passing through the grate and on to the grain table in usual manner.

Since all of the thrashing is accomplished at the point where the teeth 5 or $5^a$ cooperate with the cylinder teeth, the machine may be driven with considerably less power since the usual toothed or spiked concave which ordinarily extends around a considerable portion of the under side of the cylinder, is dispensed with, thus permitting the straw to be easily carried beneath the cylinder.

The present construction also retards the movement of the grain at the point where it is first engaged by the cylinder, producing a more uniform and regular thrashing than is accomplished with the ordinary construction provided with the toothed concave. The separator is thus aided in doing better work, as the grain is fed uniformly and regularly thereto.

Cracking of the grain is also reduced to a minimum, by eliminating the spiked concave, as well as the bending or breaking of the cylinder spikes, while the usual trouble caused by bending or breaking of the spikes on the concave, is entirely obviated by eliminating the toothed concave.

I claim:—

1. A thrashing machine including a rotary spiked cylinder, a plate at one side of the cylinder, having a single row of teeth substantially tangential to the periphery of the cylinder, and arranged to cooperate with the spikes upon the cylinder, and a curved toothless grate adjacent to the toothed plate and extending substantially half way around the cylinder.

2. A thrashing machine including a rotary spiked cylinder, a toothless curved grate extending substantially around the under half of the cylinder, a grain pan inclined toward one end of the grate and a plate between the grain pan and grate, provided with a single row of teeth substantially tangential to the periphery of the cylinder and arranged to cooperate with the spikes upon the cylinder.

3. A thrashing machine including a rotary spiked cylinder, a plate at one side of the cylinder having a single row of teeth, the forward edge of each tooth being substantially tangential to the periphery of the cylinder and the rear edge of each tooth being concaved forming a grain holding pocket, said teeth being arranged to co-operate with the spikes upon the cylinder and a curved toothless grate adjacent to the toothed plate and extending substantially halfway around the cylinder.

In testimony that I claim the above, I have hereunto subscribed my name.

WILLIAM C. McCULLOUGH.